United States Patent
Lillie et al.

(10) Patent No.: US 11,374,976 B2
(45) Date of Patent: Jun. 28, 2022

(54) SYSTEM FOR AUTHENTICATION OF RESOURCE ACTIONS BASED ON MULTI-CHANNEL INPUT

(71) Applicant: BANK OF AMERICA CORPORATION, Charlotte, NC (US)

(72) Inventors: Christina Lillie, Ann Arbor, MI (US); Justin Riley DuPont, Charlotte, NC (US); Malathi Jivan, San Jose, CA (US); Heather Dolan, Sarasota, FL (US); Poppy Marie Kimball, Redwood City, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 177 days.

(21) Appl. No.: 16/653,199

(22) Filed: Oct. 15, 2019

(65) Prior Publication Data
US 2021/0112098 A1 Apr. 15, 2021

(51) Int. Cl.
*H04L 9/40* (2022.01)
*H04W 12/06* (2021.01)
(Continued)

(52) U.S. Cl.
CPC .............. *H04L 63/18* (2013.01); *G06F 21/31* (2013.01); *G06F 21/32* (2013.01); *G06F 21/35* (2013.01);
(Continued)

(58) Field of Classification Search
CPC ............. H04L 63/0861; H04L 63/0853; H04L 63/083; G06F 21/32; G06F 21/35; G06F 21/31; H04W 12/06
See application file for complete search history.

(56) References Cited

U.S. PATENT DOCUMENTS 8,695,074 B2  4/2014  Saraf et al.
9,548,979 B1 *  1/2017  Johnson .............. H04L 63/0861
(Continued)

OTHER PUBLICATIONS

Zhang, Linghan, Sheng Tan, and Jie Yang. "Hearing your voice is not enough: An articulatory gesture based liveness detection for voice authentication." Proceedings of the 2017 ACM SIGSAC Conference on Computer and Communications Security. 2017, pp. 57-71. (Year: 2017).*
(Continued)

*Primary Examiner* — Kari L Schmidt
(74) *Attorney, Agent, or Firm* — Moore & Van Allen PLLC; Nicholas C. Russell (57) ABSTRACT

Embodiments of the present invention provide systems and methods for authentication of users and authorization of user actions, and distribution or transfer of resources based on multi-channel input via a user device or one or more auxiliary user devices, such as smart home devices. The system is further configured to perform one or more user activities, in an integrated manner, within a single interface of the user device, without requiring the user to operate disparate applications. Furthermore, the system is configured to receive user input through multiple communication channels such as a textual communication channel and an audio communication channel and store unique user patterns to form an authentication baseline for subsequent user communications.

17 Claims, 5 Drawing Sheets

(51) Int. Cl.
*G06Q 20/40* (2012.01)
*G06F 21/35* (2013.01)
*G06F 21/31* (2013.01)
*G06F 21/32* (2013.01)

(52) U.S. Cl.
CPC ........... *G06Q 20/40* (2013.01); *H04L 63/083* (2013.01); *H04L 63/0853* (2013.01); *H04L 63/0861* (2013.01); *H04W 12/06* (2013.01); *H04L 2463/082* (2013.01)

(56) References Cited

U.S. PATENT DOCUMENTS

| | | | |
|---|---|---|---|
| 9,607,621 B2* | 3/2017 | Karpey | G10L 15/26 |
| 10,229,450 B2 | 3/2019 | Lee et al. | |
| 10,276,170 B2 | 4/2019 | Gruber et al. | |
| 10,297,253 B2 | 5/2019 | Walker, II et al. | |
| 10,354,011 B2 | 7/2019 | Nell et al. | |
| 10,354,652 B2 | 7/2019 | Huang et al. | |
| 10,354,653 B1* | 7/2019 | Vijayvergia | G10L 15/26 |
| 10,650,824 B1* | 5/2020 | Kesharaju | G10L 17/10 |
| 10,735,411 B1* | 8/2020 | Hardt | G06N 20/00 |
| 10,779,162 B1* | 9/2020 | Wei | H04W 88/04 |
| 10,896,673 B1* | 1/2021 | Garner, IV | G10L 17/20 |
| 2002/0147658 A1 | 10/2002 | Kwan | |
| 2003/0163739 A1* | 8/2003 | Armington | G10L 17/00 726/3 |
| 2004/0064406 A1 | 4/2004 | Yates et al. | |
| 2005/0185779 A1* | 8/2005 | Toms | H04M 3/2281 379/114.14 |
| 2007/0185718 A1* | 8/2007 | Di Mambro | G07C 9/37 704/270.1 |
| 2009/0206993 A1* | 8/2009 | Di Mambro | G07C 9/37 340/5.84 |
| 2011/0143711 A1 | 6/2011 | Hirson et al. | |
| 2013/0225128 A1* | 8/2013 | Gomar | H04W 12/06 455/411 |
| 2014/0222676 A1 | 8/2014 | Lee et al. | |
| 2014/0278438 A1* | 9/2014 | Hart | G06F 3/167 704/275 |
| 2014/0343943 A1* | 11/2014 | Al-Telmissani | G06F 21/32 704/246 |
| 2015/0058016 A1* | 2/2015 | Goldstein | G06F 21/32 704/246 |
| 2015/0067822 A1* | 3/2015 | Randall | G06F 21/32 726/17 |
| 2015/0161871 A1* | 6/2015 | Kim | A61B 5/7475 340/539.12 |
| 2016/0093304 A1* | 3/2016 | Kim | G10L 17/26 704/235 |
| 2017/0194004 A1* | 7/2017 | Lousky | G10L 17/04 |
| 2017/0330215 A1 | 11/2017 | Bruno et al. | |
| 2018/0004925 A1 | 1/2018 | Petersen et al. | |
| 2018/0047394 A1* | 2/2018 | Tian | G10L 17/22 |
| 2018/0068317 A1 | 3/2018 | Gilbey et al. | |
| 2018/0233152 A1* | 8/2018 | Olaya | G10L 15/22 |
| 2018/0342329 A1 | 11/2018 | Rufo et al. | |
| 2018/0365695 A1 | 12/2018 | Liu et al. | |
| 2018/0366125 A1 | 12/2018 | Liu et al. | |
| 2019/0074007 A1 | 3/2019 | Torpy et al. | |
| 2019/0089831 A1 | 3/2019 | Medlen et al. | |
| 2019/0155617 A1* | 5/2019 | Buchanan | G06F 9/4451 |
| 2019/0156079 A1 | 5/2019 | Espinosa | |
| 2019/0228780 A1* | 7/2019 | Athias | G06F 21/32 |
| 2019/0230070 A1 | 7/2019 | Isaacson et al. | |
| 2020/0019688 A1* | 1/2020 | Jhawar | G10L 17/22 |
| 2020/0184963 A1* | 6/2020 | Joseph | G06F 3/167 |
| 2021/0065719 A1* | 3/2021 | Wang | G06F 21/32 |

OTHER PUBLICATIONS

A. Boles and P. Rad, "Voice biometrics: Deep learning-based voiceprint authentication system," 2017 12th System of Systems Engineering Conference (SoSE), 2017, pp. 1-6. (Year: 2017).*

X. Yuan et al., "All Your Alexa Are Belong to Us: A Remote Voice Control Attack against Echo," 2018 IEEE Global Communications Conference (GLOBECOM), 2018, pp. 1-6. (Year: 2018).*

* cited by examiner

SYSTEM FOR AUTHENTICATION OF RESOURCE ACTIONS BASED ON MULTI-CHANNEL INPUT

FIELD OF THE INVENTION

The present invention is generally related to systems and methods for providing convenient and accessible resource transfer using a multi-channel resource technology system. Multiple devices may be utilized by the multi-channel resource system in order to receive and process data to complete resource actions.

BACKGROUND

Existing systems require a user to navigate multiple applications and perform numerous actions to perform electronic activities or initiate resource transfers on an electronic device. Furthermore, execution of the electronic activities requires the user to be adept with various distinct functions and technology elements of a myriad applications in order to retrieve certain information or authenticate resource transfers. As such, conducting electronic activities on electronic devices to retrieve desired information or authorize resource transfers is often time consuming, cumbersome and unwieldy. There is a need for an intelligent, proactive and responsive system that facilitates execution of electronic activities in an integrated manner, and which is capable of adapting to the user's natural communication and its various modes in order to provide relevant, helpful information to the user.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address these and/or other needs by providing a system for authorization of resource allocation, distribution or transfer based on multi-channel inputs that is configured for intelligent, proactive and responsive communication with a user, via a user device. The system is further configured to perform one or more user activities, in an integrated manner, within a single interface of the user device, without requiring the user to operate disparate applications. Furthermore, the system is configured to receive user input through multiple communication channels such as a textual communication channel and an audio communication channel and store unique user patterns to form an authentication baseline for subsequent user communications. The system is further configured to switch between the various communication channels seamlessly, and in real-time. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for establishing intelligent, proactive and responsive communication with a user, comprising a multi-channel user input platform for performing electronic activities in an integrated manner from a single interface, the invention comprising: providing a user resource application on a user device associated with the user, wherein the user resource application is configured to provide a multi-channel resource application on a user device associated with the user, wherein the multi-channel resource application is configured to present a central user interface on a display device of the user device; receive a voice request from the use to complete a user activity, wherein the voice request comprises voice data received via the user device or one or more auxiliary user devices; access an identification database comprising previously stored voice print data for the user; analyze the voice data of the voice request and compare the voice data against the voice print data for the user; determine a match between the voice data and the voice print data for the user; verify the identity of the user based on determining the match between the voice data and the voice print data for the user; and authorize completion of the user activity based on verifying the identity of the user.

In some embodiments, the previously stored voice print data for the user is generated by receiving a voice print sample from the user via the user device or one or more auxiliary user devices; requesting secondary authentication data from the user to verify user identity; and generating the voice print data for the user.

In some embodiments, the secondary authentication data comprises biometric authentication data.

In some embodiments, the voice print data for the user comprises patterns in the speech, dialect, pitch, and tonality of the user's voice.

In some embodiments, the user activity comprises a resource transfer or resource account action wherein resources are transferred or altered in a user resource account.

In some embodiments, analyzing the voice data of the voice request and comparing the voice data against the voice print data for the user does not result in a match, and wherein the system is further configured to: transmit a request for secondary authentication via the user device; receive secondary authentication data from the user via the user device or one or more auxiliary user devices, wherein the secondary authentication data comprises biometric data or a user passcode; verify the identity of the user based on the received secondary authentication data; and authorize completion of the user activity based on verifying the identity of the user.

In some embodiments, the voice request from the user to complete a user activity and the secondary authentication data are received via different communication channels or different devices.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein.

In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/ or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

An electronic activity, also referred to as a "technology activity" or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof.

In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a merchant or the like, who utilizes an external apparatus such as a user device, for retrieving information related to the user's business that the entity may maintain or compile. Such information related to the user's business may be related to resource transfers or transactions that other users have completed using the entity systems. The external apparatus may be a user device (computing devices, mobile devices, smartphones, wearable devices, and the like). In some embodiments, the user may seek to perform one or more user activities using a multi-channel cognitive resource application of the invention, or user application, which is stored on a user device. In some embodiments, the user may perform a query by initiating a request for information from the entity using the user device to interface with the system for adjustment of resource allocation based on multi-channel inputs in order to obtain information relevant to the user's business.

In accordance with embodiments of the invention, the term "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

Figure 1:
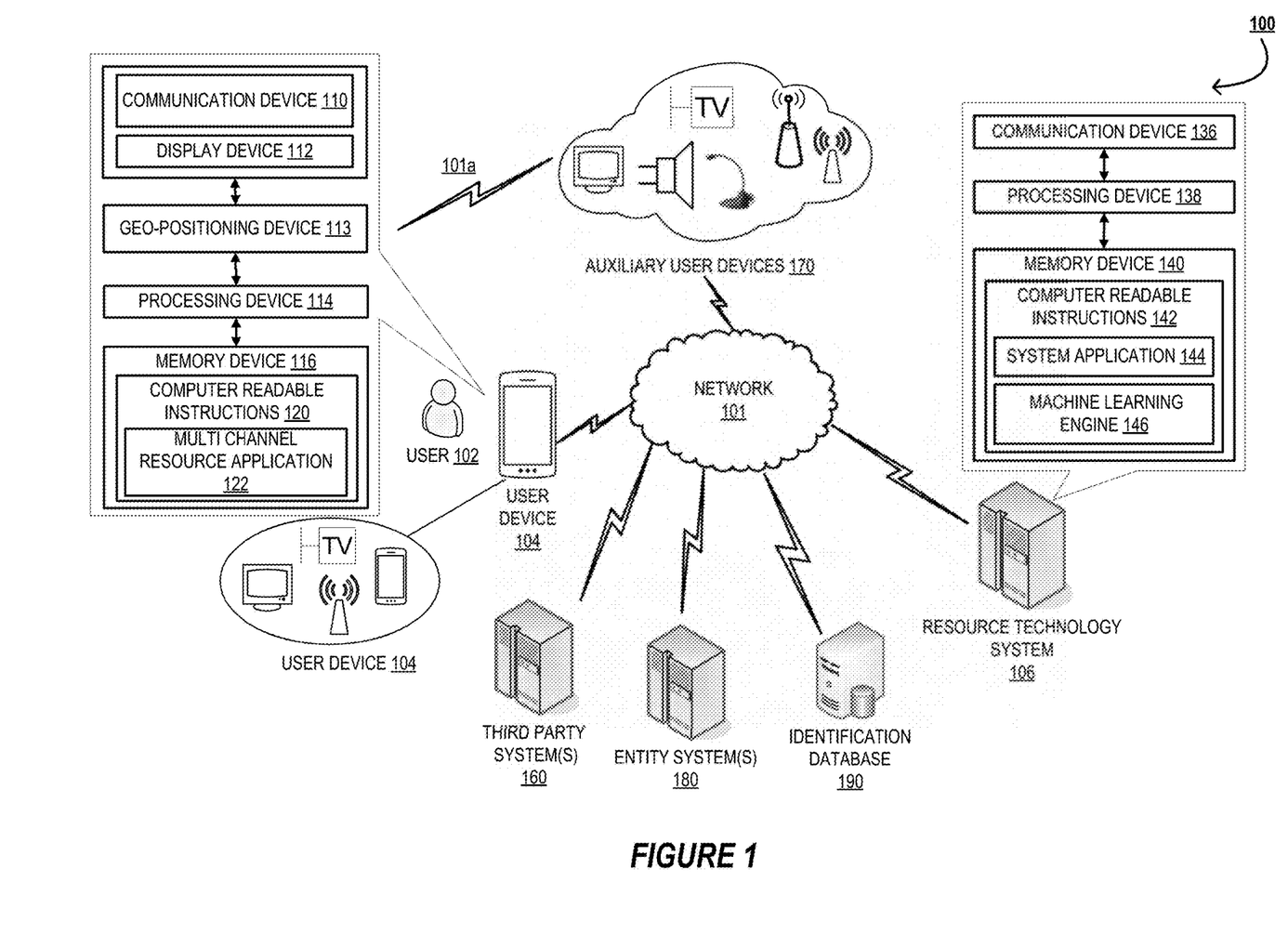
FIG. 1 depicts a system environment 100 providing a system for multi-channel user input, in accordance with one embodiment of the present invention.

FIG. 1 depicts a platform environment 100 providing a system for adjustment of resource allocation based on multi-channel inputs, in accordance with one embodiment of the present invention. As illustrated in FIG. 1, a resource technology system 106, configured for providing an intelligent, proactive and responsive application or system, at a user device 104, which facilitates execution of electronic activities in an integrated manner, and which is capable of adapting to the user's natural communication and its various modes by allowing seamless switching between communication channels/mediums in real time or near real time. The resource technology system is operatively coupled, via a network 101 to one or more user devices 104, auxiliary user devices 170, to entity systems 180, identification database 190, third party systems 160, and other external systems/third-party servers not illustrated herein. In this way, the resource technology system 106 can send information to and receive information from multiple user devices 104 and auxiliary user devices 170 to provide an integrated platform with multi-channel cognitive resource capabilities to a user 102, and particularly to the user device 104. At least a portion of the system for adjustment of resource allocation based on multi-channel inputs is typically configured to reside on the user device 104 (for example, at the user application 122), on the resource technology system 106 (for example, at the system application 144), and/or on other devices and system and is an intelligent, proactive, responsive system that facilitates execution of electronic activities in an integrated manner. Furthermore, the system for adjustment of resource allocation based on multi-channel inputs is capable of seamlessly adapting to and switch between the user's natural communication and its various modes (such as speech or audio communication, textual communication in the user's preferred natural language, gestures and the like), and is typically infinitely customizable by the system 106 and/or the user 102.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170, (for example, based on reeving a user input, or when the user device 104 is within a predetermined proximity or broadcast range of the auxiliary devices 170), as illustrated by communication channel 101a. Therefore, the system, via the network 101 may establish, operative connections between otherwise incompatible devices, for example by establishing a communication channel 101a between the one or more user devices 104 and the auxiliary user devices 170. In this regard, the network 101 (and particularly the communication channels 101a) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 or it may include only waving or holding the external apparatus near an appropriate portion of the auxiliary user device without making physical contact with the auxiliary user device.

In some embodiments, the user 102 is an individual that wishes to conduct one or more activities with resource technology system 106 using the user device 104. In some embodiments, the user 102 may access the resource technology system 106, and/or the entity system 180 through a user interface comprising a webpage or a user application. Hereinafter, "user application" is used to refer to an application on the user device 104 of the user 102, a widget, a webpage accessed through a browser, and the like. As such, in some instances, the user device may have multiple user applications stored/installed on the user device 104 and the memory device 116 in particular. In some embodiments, the user application is a user application 122, also referred to as a "user application" 122 herein, provided by and stored on the user device 104 by the resource technology system 106. In some embodiments the user application 122 may refer to a third party application or a user application stored on a cloud used to access the resource technology system 106 and/or the auxiliary user device 170 through the network 101, communicate with or receive and interpret signals from auxiliary user devices 170, and the like. In some embodiments, the user application is stored on the memory device 140 of the resource technology system 106, and the user interface is presented on a display device of the user device 104, while in other embodiments, the user application is stored on the user device 104.

The user 102 may subsequently navigate through the interface or initiate one or more user activities or resource transfers using a central user interface provided by the user application 122 of the user device 104. In some embodiments, the user 102 may be routed to a particular destination or entity location using the user device 104. In some embodiments the auxiliary user device 170 requests and/or receives additional information from the resource technology system 106/the resource entity system 160 and/or the user device 104 for authenticating the user and/or the user device, determining appropriate queues, executing information queries, and other functions.

FIG. 1 also illustrates the user device 104. The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the resource entity system 160, the auxiliary user device 170 and the resource technology system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 2. The display device 112 may comprise a screen, a speaker, a vibrating device or other devices configured to provide information to the user. In some embodiments, the display device 112 provides a presentation of the central user interface of the integrated user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, monitors, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, initiate activities, and interact with or receive and decode signals from the auxiliary user devices 170, communicate with the resource technology system 106 to request or transmit information, authorize a transaction, and/or complete a transaction using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120 such as computer readable/executable code of the user application 122, when executed by the processing device 114 are configured to cause the user device 104 and/or processing device 114 to perform one or more steps described in this disclosure, or to cause other systems/devices to perform one or more steps described herein.

As further illustrated in FIG. 1, the resource technology system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the resource entity systems 160, auxiliary user devices 170 and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the resource technology system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices (such as the user device 104, the user application 122, and the like) to perform one or more steps described herein. In some embodiments, the memory device 140 includes a data storage for storing data related to user transactions and resource entity information, but not limited to data created and/or used by the system application 144. Resource technology system 106 also includes machine learning engine 146. In some embodiments, the machine learning engine 146 is used to analyze received data in order to identify complex patterns and intelligently improve the efficiency and capability of the resource technology system 106 to analyze received voice print data and identify unique patterns. In some embodiments, the machine learning engine 146 may included supervised learning techniques, unsupervised learning techniques, or a combination of multiple machine learning models that combine supervised and unsupervised learning techniques. In some embodiments, the machine learning engine may include an adversarial neural network that uses a process of encoding and decoding in order to adversarial train one or more machine learning models to identify relevant patterns in received data received from one or more channels of communication.

FIG. 1 further illustrates one or more auxiliary user devices 170, in communication with the network 101. The auxiliary user devices 170 may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like.

In the embodiment illustrated in FIG. 1, and described throughout much of this specification, a "system" configured for performing one or more steps described herein refers to the user application 122, that may perform one or more user activities either alone or in conjunction with the resource technology system 106, and specifically, the system application 144, one or more auxiliary user device 170, and the like in order to provide a system for adjustment of resource allocation or execution of user activities, resource activities, and the like based on multi-channel inputs.

The functions, and features of the system for adjustment of resource allocation based on multi-channel inputs will now be described in detail. As such, the system for adjustment of resource allocation based on multi-channel inputs, and the user application 122 in particular, are configured to function as an intelligent personal assistant and resource navigator and are configured to perform one or more electronic user activities. In particular, the system is configured to present an integrated central user interface for communicating with the user via natural language or conversation channels, for requesting and transmitting biometric authentication information, and for integrating the functionality of multiple applications in a single interface without requiring the user to access the multiple applications individually and be proficient in their operation. In addition, the system for adjustment of resource allocation may store identification and authentication information for future use to expedite the completion of subsequent resource activities. In some instances, after initial authorization or authentication of a user during an initial resource activity, the system may authenticate the user by using alternate authentication techniques during the completion of subsequent resource activities.

As such, the user application 122 is configured to perform one or more user activities in a convenient manner, via a central user interface of the application 122. In this regard, in some embodiments, the central user interface is presented on one or more user devices via the user application 122 or another user application 122. The central user interface associated with the user application 122 may be presented on the display device 112 of the user device 104 in response to receiving an indication from the user (for example, receiving a voice command from the user with an identifier, receiving a tactile indication or a fingerprint authentication from the user device 104, facial recognition information from the user device 104, and other authentication credentials, and the like), automatically in response to detecting an action trigger (for example, determining that the user is attempting to perform a resource activity by using a particular application or additional device, such as auxiliary user device 170, and the like). Additionally, the user application 122 may be configured to proactively alert the user of information analyzed and compiled by the resource technology system 106 and entity systems 180. This information may include resource activity or transaction information related to other users that interact with the resource technology system 106 if the resource transaction information is identified as being relevant and potentially useful to the user 102.

Typically, the central user interface is a computer human interface, and specifically a natural language/conversation user interface provided by the resource technology system 106 to the user 102 via the user device 104 or auxiliary user device 170. The various user devices receive and transmit user input to the entity systems 180 and resource technology system 106. The user device 104 and auxiliary user devices 170 may also be used for presenting information regarding user activities, providing output to the user 102, and otherwise communicating with the user 102 in a natural language of the user 102, via suitable communication mediums such as audio, textual, and the like. The natural language of the user comprises linguistic variables such as words, phrases and clauses that are associated with the natural language of the user 102. The system is configured to receive, recognize and interpret these linguistic variables of the user input and perform user activities and resource activities accordingly. In this regard, the system is configured for natural language processing and computational linguistics. In many instances, the system is intuitive, and is configured to anticipate user requirements, data required for a particular activity and the like, and request activity data from the user 102 accordingly.

Also pictured in FIG. 1 are one or more third party systems 160, which are operatively connected to the resource technology system 106 via network 101 in order to transmit data associated with user activities, user authentication, user verification, resource actions, and the like. For instance, the capabilities of the resource technology system 106 may be leveraged in some embodiments by third party systems in order to authenticate user actions based on data provided by the third party systems 160, third party applications running on the user device 104 or auxiliary user devices 170, as analyzed and compared to data stored by the resource technology system 106, such as data stored in the identification database 190 or stored at entity systems 180. In some embodiments, the multi-channel cognitive processing capabilities may be provided as a service by the resource technology system 106 to the entity systems 180, third party systems 160, or additional systems and servers not pictured, through the use of an application programming interface ("API") designed to simplify the communication protocol for client-side requests for data or services from the resource technology system 106. In this way, the capabilities offered by the present invention may be leveraged by multiple parties other than the those controlling the resource technology system 106 or entity systems 180.

Figure 2:
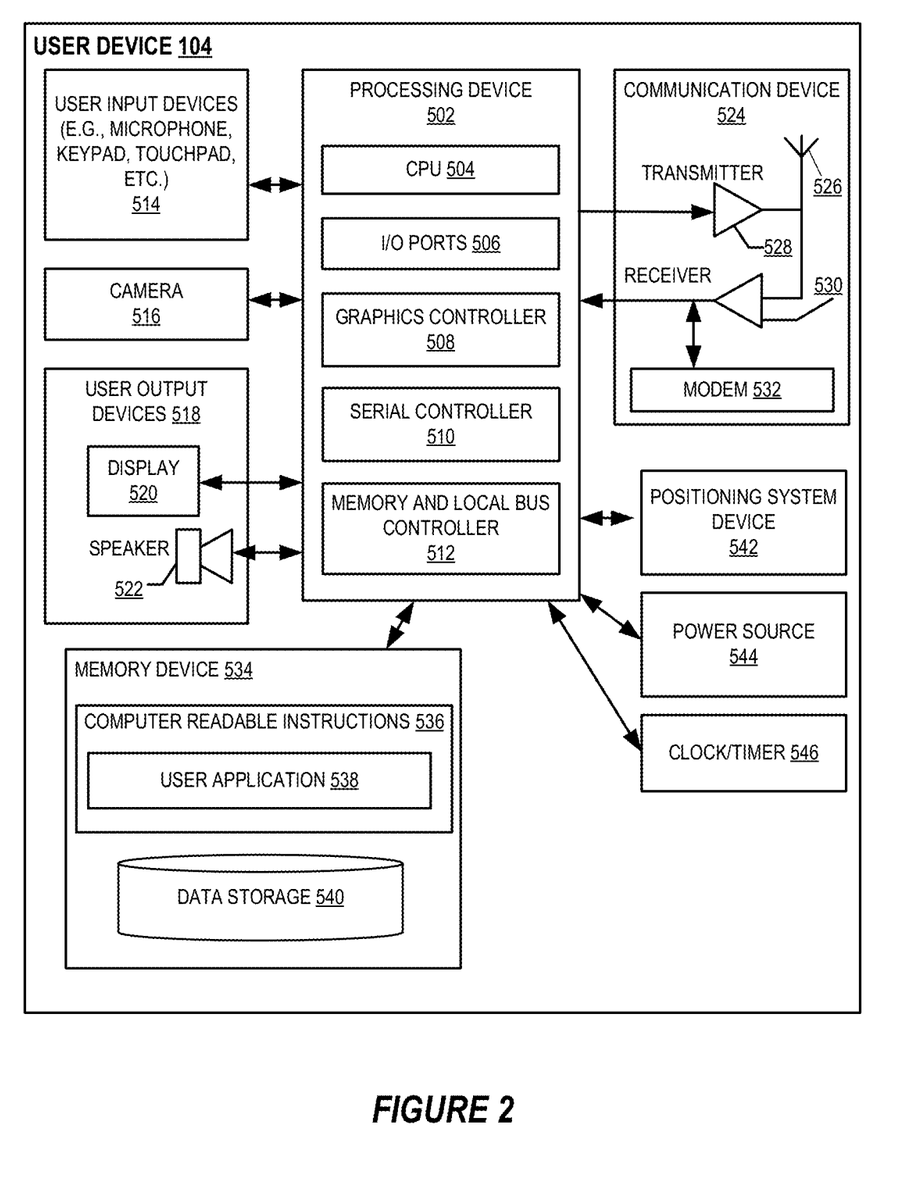
FIG. 2 provides a block diagram of the user device 104, in accordance with one embodiment of the invention.

FIG. 2 provides a block diagram of the user device 104, in accordance with one embodiment of the invention. The user device 104 may generally include a processing device or processor 502 communicably coupled to devices such as, a memory device 534, user output devices 518 (for example, a user display device 520, or a speaker 522), user input devices 514 (such as a microphone, keypad, touchpad, touch screen, and the like), a communication device or network interface device 524, a power source 544, a clock or other timer 546, a visual capture device such as a camera 516, a positioning system device 542, such as a geo-positioning system device like a GPS device, an accelerometer, and the like. The processing device 502 may further include a central processing unit 504, input/output (I/O) port controllers 506, a graphics controller or graphics processing device (GPU) 208, a serial bus controller 510 and a memory and local bus controller 512.

The processing device 502 may include functionality to operate one or more software programs or applications, which may be stored in the memory device 534. For example, the processing device 502 may be capable of operating applications such as the multi-channel resource application 122. The multi-channel resource application 122 may then allow the user device 104 to transmit and receive data and instructions from the other devices and systems of the environment 100. The user device 104 comprises computer-readable instructions 536 and data storage 540 stored in the memory device 534, which in one embodiment includes the computer-readable instructions 536 of a multi-channel resource application 122. In some embodiments, the multi-channel resource application 122 allows a user 102 to access and/or interact with other systems such as the entity system 180, third party system 160, or resource technology system 106. In one embodiment, the user 102 is a maintaining entity of a resource technology system 106, wherein the user application enables the user 102 to define policies and reconfigure the resource technology system 106 or its components. In one embodiment, the user 102 is a customer of a financial entity and the multi-channel resource application 122 is an online banking application providing access to the entity system 180 wherein the user may interact with a resource account via a user interface of the multi-channel resource application 122, wherein the user interactions may be provided in a data stream as an input via multiple channels. In some embodiments, the user 102 may a customer of third party system 160 that requires the use or capabilities of the resource technology system 106 for authorization or verification purposes.

The processing device 502 may be configured to use the communication device 524 to communicate with one or more other devices on a network 101 such as, but not limited to the entity system 180 and the resource technology system 106. In this regard, the communication device 524 may include an antenna 526 operatively coupled to a transmitter 528 and a receiver 530 (together a "transceiver"), modem 532. The processing device 502 may be configured to provide signals to and receive signals from the transmitter 528 and receiver 530, respectively. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance, audio frequency, ultrasound frequency, or other communication/data networks.

The user device 104 may also include a memory buffer, cache memory or temporary memory device operatively coupled to the processing device 502. Typically, one or more applications, are loaded into the temporarily memory during use. As used herein, memory may include any computer readable medium configured to store data, code, or other information. The memory device 534 may include volatile memory, such as volatile Random Access Memory (RAM) including a cache area for the temporary storage of data. The memory device 534 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 180 which is connected to the user device 104 and the resource technology system 106 and which may be associated with one or more entities, institutions, third party systems 160, or the like. In this way, while only one entity system 180 is illustrated in FIG. 1, it is understood that multiple networked systems may make up the system environment 100. The entity system 180 generally comprises a communication device, a processing device, and a memory device. The entity system 180 comprises computer-readable instructions stored in the memory device, which in one embodiment includes the computer-readable instructions of an entity application. The entity system 180 may communicate with the user device 104 and the resource technology system 106 to provide access to user accounts stored and maintained on the entity system 180. In some embodiments, the entity system 180 may communicate with the resource technology system 106 during an interaction with a user 102 in real-time, wherein user interactions may be monitored and processed by the resource technology system 106 in order to analyze interactions with the user 102 and reconfigure the machine learning model in response to changes in a received or monitored data stream. In one embodiment, the system is configured to receive data for decisioning, wherein the received data is processed and analyzed by the machine learning model to determine a conclusion.

Figure 3:
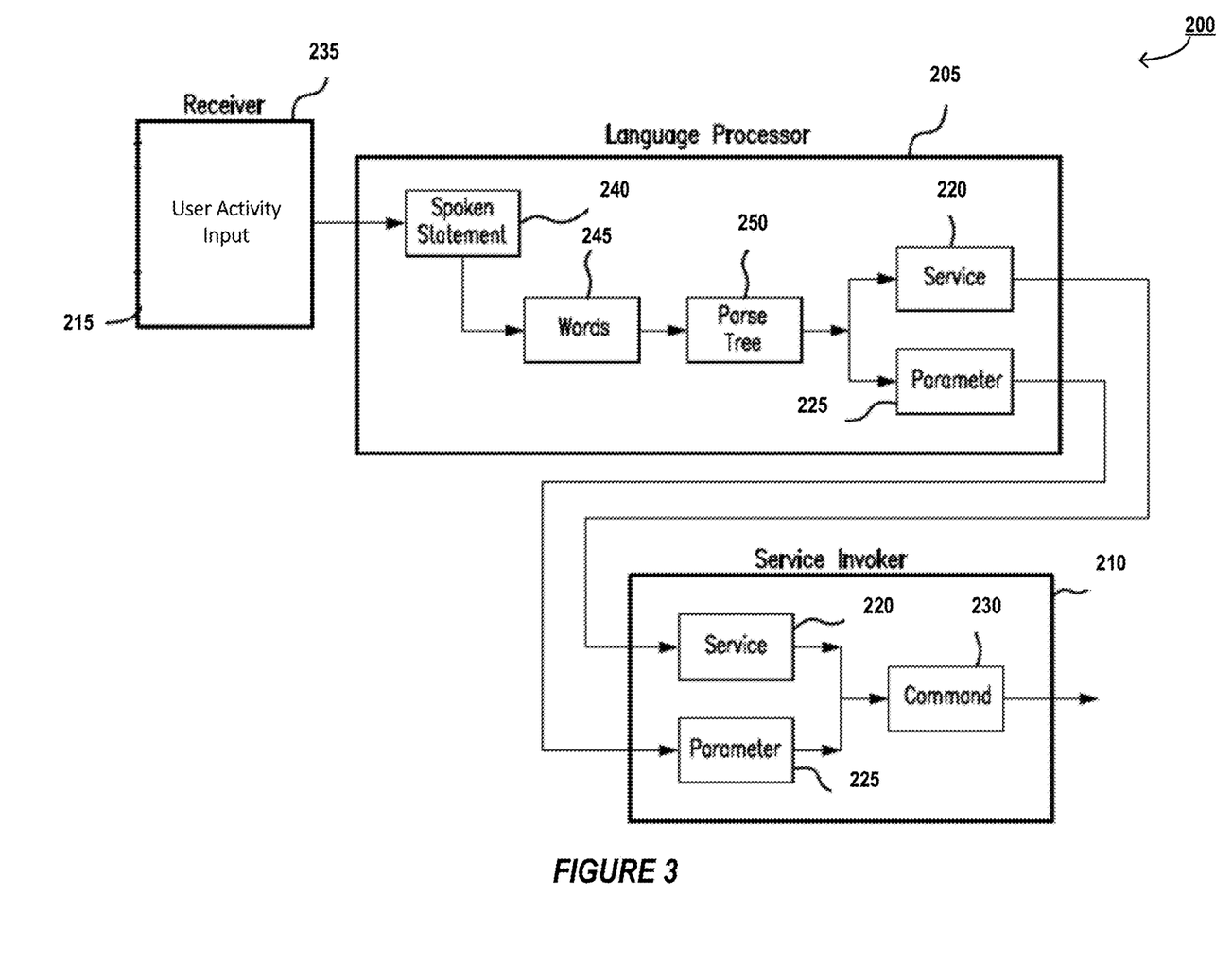
FIG. 3 depicts a process flow of a language processing module 200, in accordance with one embodiment of the present invention.

FIG. 3 depicts a high level process flow of a language processing module 200 of a multi-channel resource platform application, in accordance with one embodiment of the invention. The language processing module 100 is typically a part of the multi-channel resource application 122 of the user device, although in some instances the language processing module resides on the resource technology system 106. As discussed earlier, the natural language of the user comprises linguistic variables such as verbs, phrases and clauses that are associated with the natural language of the user. The system, and the language processing module 200 in particular, is configured to receive, recognize and interpret these linguistic phenomena of the user input and perform user activities accordingly. In this regard, the language processing module 200 is configured for natural language processing and computational linguistics. As illustrated in FIG. 2, the language processing module 200 includes a receiver 235 (such as a microphone, a touch screen or another user input or output device), a language processor 205 and a service invoker 210.

Receiver 235 receives a user activity input 215 from the user, such as a spoken statement, provided using an audio communication medium. Although described in this particular embodiment in the context of an audio communication medium, the language processing module 200 is not limited to this medium and is configured to operate on input received through other mediums such as textual input, graphical input (such as sentences/phrases in images or videos), and the like. As an example, the user may provide an activity input comprising the sentence "I want to purchase product X." The receiver 235 may receive the user activity input 215 and forward the user activity input 215 to the language processor 205. An example algorithm for the receiver 235 is as follows: wait for user activity input; receive user activity input; identify medium of user activity input as spoken statement; and forward spoken statement 240 to language processor 205.

The language processor 205 receives spoken statement 240 and processes spoken statement 240 to determine an appropriate service 220 to invoke to respond to the user activity input 215 and any parameters 225 needed to invoke service 220. The language processor 205 may detect a plurality of words 245 in spoken statement 240. Using the previous example, words 245 may include: purchase, and product X. The language processor 205 may process the detected words 245 to determine the service 220 to invoke to respond to user activity input 215.

The language processor 205 may generate a parse tree based on the detected words 245. Parse tree may indicate the language structure of spoken statement 240. Using the previous example, parse tree may indicate a verb and infinitive combination of "want" and "to purchase" and an object of "product" with the modifier of "X." The language processor 205 may then analyze the parse tree to determine the intent of the user and the activity associated with the conversation to be performed. For example, based on the example parse tree, the language processor 205 may determine that the user wants to purchase a specific product, which would be the identified service 220. Additionally, the system may recognize that certain parameters 225 are required to complete the service 220, such as required authentication in order to initiate a resource transfer from a user account, and may identify these parameters 225 before forwarding information to the service invoker 210.

An example algorithm for the language processor 205 is as follows: wait for spoken statement 240; receive spoken statement 240 from receiver 235; parse spoken statement 240 to detect one or more words 245; generate parse tree using the words 245; detect an intent of the user by analyzing parse tree; use the detected intent to determine a service to invoke; identify values for parameters requires to complete the service 220; and forward service 220 and the values of parameters 225 to service invoker 210.

Next, the service invoker 210 receives determined service 220 comprising required functionality and the parameters 225 from the language processor 205. The service invoker 210 may analyze service 220 and the values of parameters 225 to generate a command 230. Command 230 may then be sent to instruct that service 220 be invoked using the values of parameters 225. In response, the language processor 205 may invoke a resource transfer functionality of a multi-channel resource application 122 of the user device, for example, by extracting pertinent elements and embedding them within the central user interface, or by requesting authentication information from the user via the central user interface. An example algorithm for service invoker 210 is as follows: wait for service 220; receive service 220 from the language processor 205; receive the values of parameters 225 from the language processor 205; generate a command 230 to invoke the received service 220 using the values of parameters 225; and communicate command 230 to invoke service 230.

In some embodiments, the system also includes a transmitter that transmits audible signals, such as questions, requests and confirmations, back to the user. For example, if the language processor 205 determines that there is not enough information in spoken statement 240 to determine which service 220 should be invoked, then the transmitter may communicate an audible question back to the user for the user to answer. The answer may be communicated as another spoken statement 240 that the language processor 205 can process to determine which service 220 should be invoked. As another example, the transmitter may communicate a textual request back to the user. If the language processor 205 determines that certain parameters 225 are needed to invoke a determined service 220 but that the user has not provided the values of these parameters 225. For example, if the user had initially stated "I want to purchase product x," the language processor 205 may determine that certain values for service 220 are missing. In response, the transmitter may communicate the audible request "how many/much of product X would you like to purchase?" As yet another example, the transmitter may communicate an audible confirmation that the determined service 220 has been invoked. Using the previous example, the transmitter may communicate an audible confirmation stating "Great, let me initiate that transaction." In this manner, the system may dynamically interact with the user to determine the appropriate service 220 to invoke to respond to the user.

Figure 4:
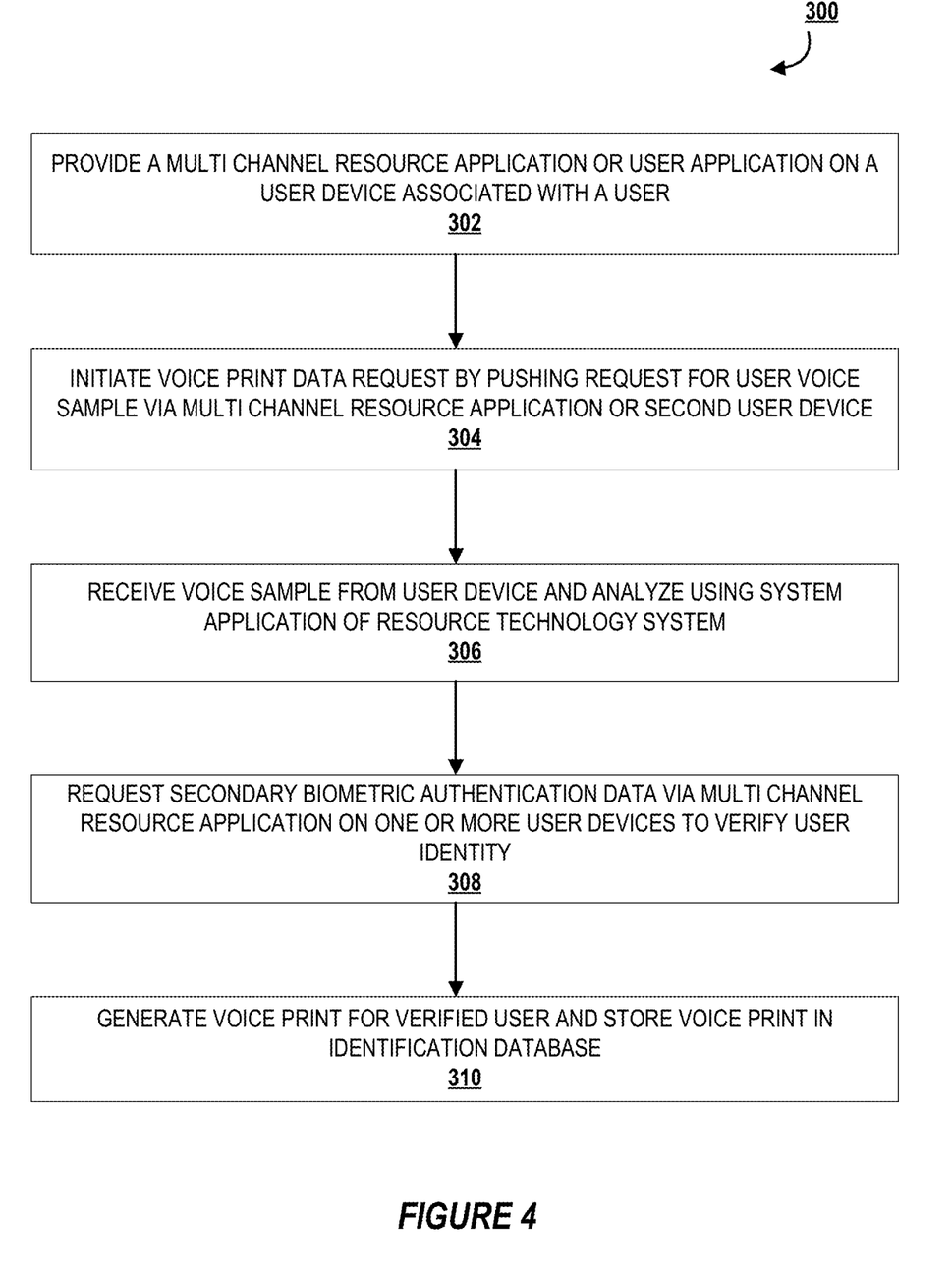
FIG. 4 depicts a high-level process flow 300 for initial multi-channel authentication and voice print establishment, in accordance with one embodiment of the present invention.

FIG. 4 illustrates a high-level process flow 300 for initial multi-channel authentication and voice print establishment, in accordance with one embodiment of the present invention. Although, the high-level process flow 300 is described with respect to a user mobile device, it is understood that the process flow is applicable to a variety of other user devices, such as a voice controlled smart home device. Furthermore, one or more steps described herein may be performed by the user mobile device 104, user application 122, and/or the resource technology system 106. The user application 122 stored on a user mobile device, is typically configured to launch, control, modify and operate applications stored on the mobile device. In this regard, the user application 122 facilitates the user 102 to perform a resource activity, such as conduct a transaction or complete a resource transfer between resource accounts.

In some embodiments, the resource technology system 160 is configured to conduct, via the central user interface of one or more user devices, a conversation with the user. As discussed previously, the central user interface is a computer human interface, and specifically a natural language/conversation user interface for receiving user input (for example, for creating, selecting and modifying data/functionality), presenting information regarding user activities, providing output to the user, and otherwise communicating with the user in a natural language of the user, via suitable communication mediums such as audio, textual, and the like. A "conversation" as referred to herein may comprise receiving a user input using a suitable communication channel/medium, providing an output to the user using a suitable communication channel/medium, a dialog or interchange comprising receiving one or more user input and providing relevant one or more outputs, and the like. Typically, the conversation components, i.e., the user input received and the output provided by the multi-channel resource application are in the natural language of the user, often comprising linguistic variables such as verbs, phrases and clauses, and the like. As such, the system is configured for natural language communication across multiple communication channels (such as, speech/audio, text, and the like), and is configured to switch between them seamlessly and in real-time, during the conversation.

Conducting the conversation with the user comprises receiving, via the central user interface, an activity input or user input from the user regarding initiation of a user activity, wherein the activity input is received through a first communication medium. For example, the system is configured for communication using an audio communication medium, via an audio communication channel. In this regard, the system may receive the user activity input in the form of voice input having natural speech (for example, sentences, phrases, and the like) of the user, captured using a communication device of the user device such as a microphone. Similarly, the system is configured communication using a for textual communication medium, via a textual communication channel. Here, the user may provide user input by entering text in a natural language of the user, using a user input device such as a keypad or the display screen of the device itself. In some instances, in response to receiving the activity input, the system is configured to present the received activity input on the central user interface.

For example, the system may transform/convert the received audio input into a textual form and initiate a presentation of the transformed input on the central user interface. Similarly, the system may present the received textual input on the central user interface. In this way, the system may construct a conversation log on the central user interface comprising the received activity input from the user and output provided by the system. In response to receiving the activity input from the user, such as an audio input or textual input from the user, the system may provide output to the user in an audio form, in a visual/textual form, or both. Therefore, the present invention is extremely beneficial for users who are hearing impaired or visually impaired. In addition, the present invention provides added convenience for all users by allowing the initiation and completion of user activities that require authentication and verification of user identity by providing multiple possible avenues for communication of necessary information through various channels. Based on receiving the activity input from the user, in some embodiments, the system is configured to generate a parse tree based on detected one or more words and/or the detected keywords.

As indicated by block 302, the system is configured to provide a multi-channel resource application or user application 122 on a user device 104 associated with the user 102. Providing the application may comprise transmitting, installing, storing, initiating and/or opening the user application 122 on the user device 104. The user application 122 is further configured to present a central user interface on a display device 112 of the user device 104. In some instances, the user device 104 is configured to present the user application 122, and the central user interface based on receiving control instructions from the resource technology system 106. In some instances, the user application 122 may be running in the background on the user device, and the control instructions may cause the user application 122 stored on the user device 104 to present the central user interface or an alert on the display of the user device, automatically.

In some embodiments, prior to initiating the presentation of the central user interface or alert, the system may modify an existing display to allow the user to choose to, or prevent the user application from opening. The modification of the existing displays may comprise locking the screen for a predetermined period of time (such as 10 seconds) or until the user acquiesces the opening of the application by user voice, touch, or gesture commands. In addition, the system may also dim the brightness of the existing display for a predetermined period of time (such as 10 seconds) or until the user acquiesces the opening of the application by user voice, touch, or gesture commands, thereby reducing power requirements and drawing the user's attention. In some embodiments, based on determining that the user device 104 does not comprise a user application 122, the system may transmit control instructions that cause the user device and/or facilitate the user to download and install the user application 122. In some embodiments, the central user interface of the user application 122 is similar to the interfaces illustrated and described with respect to FIG. 3 and later on in this disclosure In this regard, in some embodiments, the system may initialize the user application 122 or cause presentation of the central user interface based on determining that the user seeks to initiate a user activity or request. In this regard, the system and/or the user device may identify that the user seeks to initiate a user activity or resource activity based on analyzing data associated with the user's business, based on analyzing user financial information, based on analyzing user social media feeds, and/or based on receiving user input provided using user input devices of the user mobile device or receiving input provided by the entity system. In some instances, the mobile device may determine that the user 102 seeks to initiate a user activity or request based on determining that the user is currently located in a resource entity or merchant facility, and specifically located near a transaction terminal or user activity interface device.

In some instances, the mobile device may determine that the user seeks to initiate a user activity based on receiving a wireless signal from an auxiliary user device 170, via a wireless network. In some instances, the auxiliary user device 170 may be a smart home device that receives voice information from the user, identifies a request or command, and initiates a user activity in response to the voice information from the user, effectively allowing the user to initiate the user activity using a verbal request or command. In some embodiments, the auxiliary user device 170 or user device 104 may determine that the user seeks to initiate a user activity based on receiving a wireless signal from one or more other devices of the user, such as a wearable device, personal computer and the like. In some instances, the resource technology system may determine that the user may seek to initiate a user activity or request based on a determined pattern in data stored by the entity system.

In some embodiments, the user activity initiated by the user may be a transaction or resource activity, such as a purchase or resource transfer between resource accounts. In such embodiments, the invention may require a specific level of authentication to initiate or fully complete the user action. For instance, the user may be required to verify their identity in order to allow the system to provide access to the user's resource account or to allow the system to initiate a resource transfer. In some embodiments, this authentication may require a passcode, biometric authentication, and the like, in order for the system to remotely verify the user's identity. In certain embodiments of the invention, varied levels of authentication may be required for initial user actions, while later initiated user actions may be completed using a different type or level of authentication. In other embodiments, the invention may build a database of stored user information received from multiple channels of communication, and may initially verify user identity using information received from one channel, and employ a different channel to receive information for later verification of subsequent user actions.

With regard to the embodiment illustrated by the flowchart in FIG. 3, the system may initiate a request to receive voice data from the user by pushing a request for a user voice sample via the multi-channel resource application on the user device 104, or a second device, such as an auxiliary user device 170, as shown in block 304. For instance, the user may communicate with the system via auxiliary user device 170, such as a smart home device, via voice communication to initiate a user action to complete a purchase. In such embodiments, the user action of completing a purchase requires the transfer of resources from a user account that may be managed by the entity systems 180 or a third party system 160. In embodiments where the user has not been previously authorized by the system using voice communication, the system requires that the user provide voice print samples in order for the system to build a voice print for the user in order to later verify the user using channels for voice communication. The user may provide a voice sample via one or more user devices, such as an auxiliary user device 170 or user device 104, at which point the system receives the voice sample from the user device and analyzes it at the resource technology system 106, as shown in block 306.

In some embodiments, the resource technology system 106 may initiate a request to the user to allow ongoing voice sampling via one or more use devices. In this way, the resource technology system 106 may build a store of voice data for the user that stores added detail over time as additional voice print data is collected for the user, and the system may continuously analyze the voice print data in order to generate a unique voice print based on the acoustic properties of the user's unique vocal tonality, pitch, cadence, speech mannerisms, dialect, natural inflection, and the like. In some embodiments, the entire voice print analysis processing, or a partial voice print analysis processing is completed locally on the user device via the multi-channel resource application 122. In other embodiments, the voice print data may be transmitted to the resource technology platform 106, where the voice print analysis is completed remotely. In either embodiment, the voice print data may be encrypted prior to transmission to the resource technology system 106 and stored securely in the identification database 190.

In instances where the system does not have a threshold level of voice information the user to verify their identity based on voice print information alone, such as instances where the user has not been previously authenticated using channels for voice communication, the system proceeds to block 308, wherein a request for secondary authentication is send to the user via the multi-channel resource application on one or more user devices to verify the user's identity. For instance, the user may be forwarded a request via the user device 104 to enter a user password, or provide some other biometric authentication to verify identity. In some embodiments, the resource technology system 106 may request access to previously stored biometric information or may bootstrap authentication capabilities associated with the user device 104 itself, such as biometric authentication information stored locally on the user device 104. For instance, in some embodiments, the request for secondary authentication may request that the user enter a password used to access a user resource account stored by the entity system 180. In other embodiments, the multi-channel resource application may request the user to provide access to biometric authentication mechanisms of the user device 104, such as fingerprint scanning, facial recognition, and the like, in order to verify the user's identity.

In some embodiments, secondary authentication may be required if the resource technology system 106 is unable to determine a verification match to verify the user's identity based on existing voice print data. For instance, the user may experience circumstances where their voice cannot be verified for some reason because the voice data provided is altered in some way (e.g., the user is sick and their voice is altered; the user is in a busy environment with background noise; the user is inadvertently covering a microphone on the user device or auxiliary device, and the like). In instances where the user is unable to be verified using voice print data alone, either due to lack of collected voice print data or problems with the transmission or collection of subsequent voice print data, the system may revert to the secondary authentication step to verify the user's identity.

After the resource technology system has received secondary authentication information for the user to verify the user's identity, the system may use the received voice sample data in order to generate a voice print for the verified user and store the voice print in a user identification database, such as identification database 190. In some embodiments, the identification database 190 may be continually updated as the resource technology system receives and analyzes additional voice print data from the user. Over time, in some embodiments, the resource technology system 106 may determine that the voice print for a specific user contains enough detail to accurately and securely verify the user based on subsequent voice print data. In such embodiments, the resource technology system 106 may bypass secondary authentication steps, allowing the user to verify their identity using voice print data alone. For instance, after building a detailed voice print for the user, the resource technology system may receive a subsequent request to perform a resource transfer to complete a purchase based on voice command alone.

In some embodiments, the system is further configured to authenticate the user for the user activity, either before or during the activity. In this regard, the user application is configured to provide centralized authentication, without requiring separate credentials for each of one or more applications that may be associated with the user activity. In some embodiments, the system is configured to identify the one or more activity events and the one or more external applications or resource entity applications required, for completing the activity events, prior to commencing the user activity. Here, the integrated user application is configured to determine authentication requirements of each of the identified one or more applications associated with completing the user activity. The integrated user application may then identify a highest level of authentication among the applications. Continuing with the previous example, the user application may identify that a mobile wallet application requiring biometric authentication is a higher level of authentication than another application requiring a passcode. In response to determining the highest level of authentication, the user application may request credentials associated with the highest level of authentication from the user in order to complete initial verification for the user activity. The successful validation of the received credentials associated with the highest level of authentication from the user, by the mobile device, is typically configured to authenticate the user for the other resource entity applications associated with the activity as well, without requiring separate authentication credentials, thereby reducing processing time. The system may then further reduce processing time for future user activities by utilizing voice print data stored for the user in order to provide the same level of authentication as was previously required by the highest level of authentication among the applications.

Figure 5:
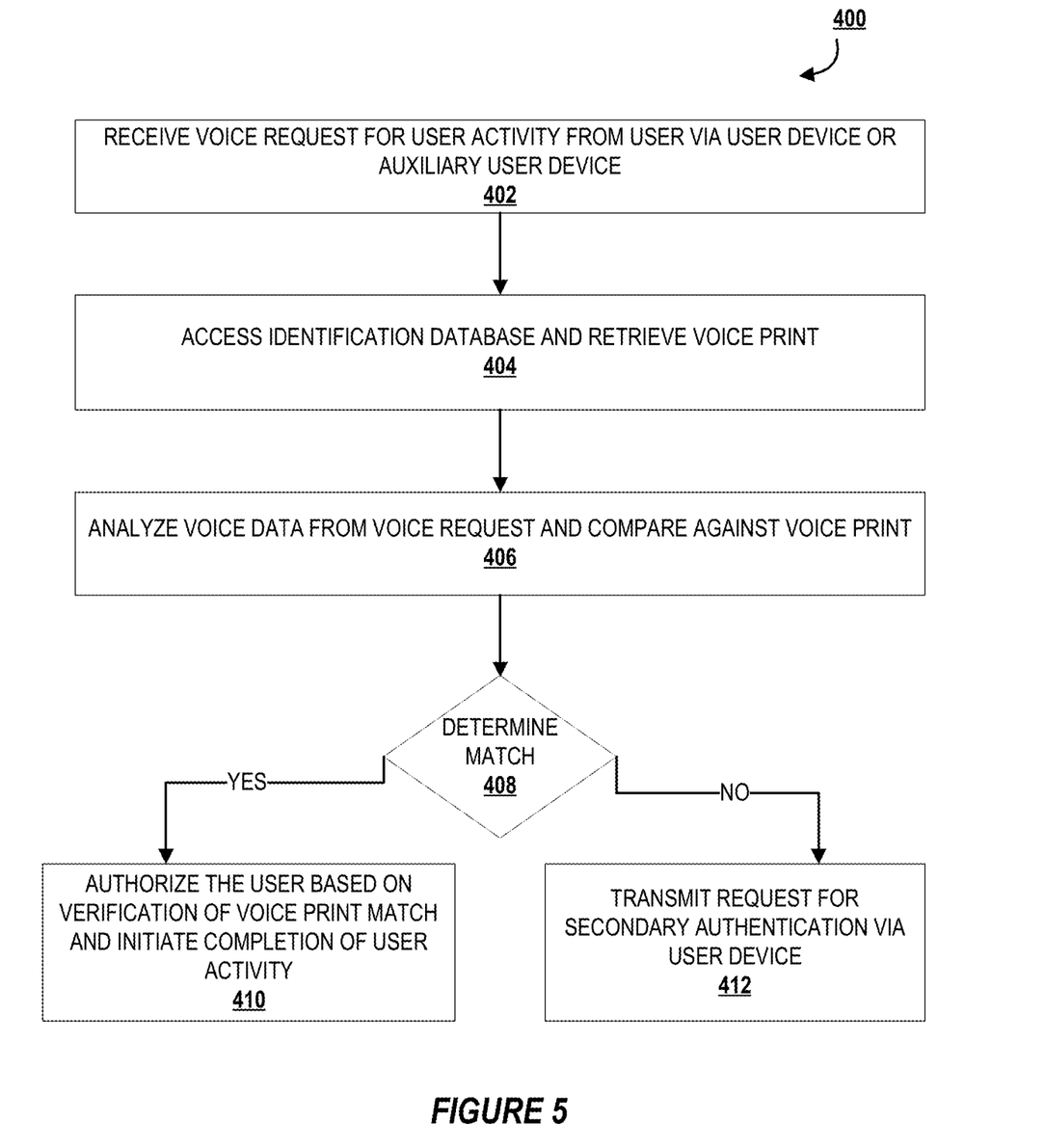
FIG. 5 depicts a high-level process flow 400 for voice print analysis and multi-channel authentication, in accordance with one embodiment of the present invention.

FIG. 5 illustrates depicts a high-level process flow 400 for voice print analysis and multi-channel authentication, in accordance with one embodiment of the present invention. As shown at block 402, the process begins wherein a voice request is received from the user activity from the user device 104 or auxiliary user device 170. In some embodiments, this may be initiated from a user device 104 or auxiliary user device 170 that has a device identification previously associated with a specific user or set of users that is used to identify the potential user or set of users that may be initiating the voice request (e.g. a user, family of users, and the like). In other embodiments, the voice request or voice data may be received from a third party system, or from a third party application running on the user device, such as via an API call request for voice-based authorization of one or more user activities. After receiving the voice request and associated voice information, the system may proceed to block 404 in order to identify or confirm the user identity. The system accesses the identification database 190 to retrieve the voice print that have been previously generated and stored by the system.

Voice data from the voice request is analyzed and compared against the voice print stored in the identification database 190, as shown in block 406. The system then determines if there is a match between the voice data of the voice request and the stored voice in the identification database 190, as shown at block 408. As shown in block 410, if the system is able to determine a match based on the voice data in the voice request, it may authorize the user based on verification of the voice print match and further authorize the completion of one or more user activities that may require identity verification. In some embodiments, the user activity may be a resource transfer, purchase, account information access, account information update, and the like.

In other embodiments, such as embodiments where the capabilities of the system are leveraged for use by third party systems and third party applications, the system may simply verify an identity match based on the received voice data, which would allow the third party systems or applications to proceed accordingly. Alternatively, if the system does not determine a match between the received voice data in the voice request and that stored in the identification database 190, the system may transmit a request to the user for secondary authentication via the user device 104 or auxiliary user device 170, such as requesting the user enter a passcode, provide an alternative form of biometric verification, and the like. In other embodiments where the system is leveraged for use by third party systems or applications, the system may simply return a failed identification match to the third party system or third party application that initiated the original request for verification.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for multi-channel authentication, the system comprising:
   at least one memory device with computer-readable program code stored thereon;
   at least one communication device;
   at least one processing device operatively coupled to the at least one memory device and the at least one communication device, wherein executing the computer-readable program code is configured to cause the at least one processing device to:
      provide a multi-channel resource application on a user device associated with a user, wherein the multi-channel resource application is configured to present a central user interface on a display device of the user device;
      receive a voice request from the user to complete an initial user activity, wherein the voice request comprises voice data received via the user device or one or more auxiliary user devices;
      respond to the voice request from the user to complete the initial user activity;
      receive a secondary voice request during a single device session from the user to complete a subsequent user activity, wherein the secondary voice request comprises voice data received via the user device or one or more auxiliary user devices, and wherein the subsequent user activity is a transaction or purchase;
      determine that the secondary voice request requires a different level of authentication as compared to the first voice request, based on the subsequent user activity being the transaction or purchase;
      access an identification database comprising previously stored voice print data for the user;
      analyze the voice data of the voice request and compare the voice data against the voice print data for the user;
      attempt to determine a match between the voice data and the voice print data for the user;
      determine that the voice data and the voice print data for the user cannot be matched due to background noise in the voice data;
      based on determining that the voice data and the voice print data for the user cannot be matched due to background noise in the voice data, and based on the subsequent user activity being the transaction or purchase, determine that secondary authentication is required;
      revert to a secondary authentication via one or more auxiliary devices;
      transmit a request for secondary authentication via the user device;
      receive secondary authentication data from the user via the one or more auxiliary user devices, wherein the secondary authentication data comprises biometric data or a user passcode;
      verify the identity of the user based on the secondary authentication data; and
      authorize completion of the subsequent user activity based on verifying the identity of the user.

2. The system of claim 1, wherein the previously stored voice print data for the user is generated by:

receiving a voice print sample from the user via the user device or one or more auxiliary user devices;
requesting secondary authentication data from the user to verify user identity; and
generating the voice print data for the user.

3. The system of claim 2, wherein the secondary authentication data comprises biometric authentication data.

4. The system of claim 1, wherein the voice print data for the user comprises patterns in speech, dialect, pitch, and tonality of the voice of the user.

5. The system of claim 1, wherein the subsequent user activity comprises a resource transfer or resource account action wherein resources are transferred or altered in a user resource account.

6. The system of claim 1, wherein the voice request from the user to complete a user activity and the secondary authentication data are received via different communication channels or different devices.

7. A computer program product for multi-channel authentication, wherein the computer program product is configured to provide a multi-channel resource platform, the computer program product comprising a non-transitory computer-readable storage medium having computer-executable instructions to:
provide a multi-channel resource application on a user device associated with a user, wherein the multi-channel resource application is configured to present a central user interface on a display device of the user device;
receive a voice request from the user to complete a user activity, wherein the voice request comprises voice data received via the user device or one or more auxiliary user devices;
respond to the voice request from the user by completing the initial user activity;
receive a secondary voice request during a single device session from the user to complete a subsequent user activity, wherein the secondary voice request comprises voice data received via the user device or one or more auxiliary user devices, and wherein the subsequent user activity is a transaction or purchase;
determine that the secondary voice request requires a different level of authentication as compared to the first voice request, based on the subsequent user activity being the transaction or purchase;
access an identification database comprising previously stored voice print data for the user;
analyze the voice data of the voice request and compare the voice data against the voice print data for the user;
attempt to determine a match between the voice data and the voice print data for the user;
determine that the voice data and the voice print data for the user cannot be matched due to background noise in the voice data;
based on determining that the voice data and the voice print data for the user cannot be matched due to background noise in the voice data, and based on the subsequent user activity being the transaction or purchase, determine that secondary authentication is required;
revert to a secondary authentication via one or more auxiliary devices;
transmit a request for the secondary authentication via the user device;
receive secondary authentication data from the user via the one or more auxiliary user devices, wherein the secondary authentication data comprises biometric data or a user passcode;
verify the identity of the user based on the secondary authentication data; and
authorize completion of the subsequent user activity based on verifying the identity of the user.

8. The computer program product of claim 7, wherein the previously stored voice print data for the user is generated by:
receiving a voice print sample from the user via the user device or one or more auxiliary user devices;
requesting secondary authentication data from the user to verify user identity; and
generating the voice print data for the user.

9. The computer program product of claim 8, wherein the secondary authentication data comprises biometric authentication data.

10. The computer program product of claim 7, wherein the voice print data for the user comprises patterns in speech, dialect, pitch, and tonality of the voice of the user.

11. The computer program product of claim 7, wherein the subsequent user activity comprises a resource transfer or resource account action wherein resources are transferred or altered in a user resource account.

12. The computer program product of claim 7, wherein the voice request from the user to complete a user activity and the secondary authentication data are received via different communication channels or different devices.

13. A computer implemented method for multi-channel authentication, wherein the computer implemented method is configured to provide a multi-channel resource platform, the computer implemented method comprising:
providing a multi-channel resource application on a user device associated with a user, wherein the multi-channel resource application is configured to present a central user interface on a display device of the user device;
receiving a voice request from the user to complete a user activity, wherein the voice request comprises voice data received via the user device or one or more auxiliary user devices;
responding to the voice request from the user to complete the initial user activity;
receiving a secondary voice request during a single device session from the user to complete a subsequent user activity, wherein the secondary voice request comprises voice data received via the user device or one or more auxiliary user devices, and wherein the subsequent user activity is a transaction or purchase;
determining that the secondary voice request requires a different level of authentication as compared to the first voice request, based on the subsequent user activity being the transaction or purchase;
accessing an identification database comprising previously stored voice print data for the user;
analyzing the voice data of the voice request and compare the voice data against the voice print data for the user;
attempting to determine a match between the voice data and the voice print data for the user;
determining that the voice data and the voice print data for the user cannot be matched due to background noise in the voice data;
based on determining that the voice data and the voice print data for the user cannot be matched due to background noise in the voice data, and based on the subsequent user activity being the transaction or purchase, determining that secondary authentication is required;

reverting to a secondary authentication via one or more auxiliary devices;

transmitting a request for the secondary authentication via the user device;

receiving secondary authentication data from the user via the one or more auxiliary user devices, wherein the secondary authentication data comprises biometric data or a user passcode;

verifying the identity of the user based on the secondary authentication data; and authorizing completion of the subsequent user activity based on verifying the identity of the user.

14. The computer implemented method of claim 13, wherein the previously stored voice print data for the user is generated by:

receiving a voice print sample from the user via the user device or one or more auxiliary user devices;

requesting secondary authentication data from the user to verify user identity; and generating the voice print data for the user.

15. The computer implemented method of claim 14, wherein the secondary authentication data comprises biometric authentication data.

16. The computer implemented method of claim 13, wherein the voice print data for the user comprises patterns in speech, dialect, pitch, and tonality of the voice of the user.

17. The computer implemented method of claim 13, wherein the voice request from the user to complete a user activity and the secondary authentication data are received via different communication channels or different devices.

* * * * *